(No Model.)
J. W. PFEIFFER.
FEED BAG SUPPORT.
No. 472,908.    Patented Apr. 12, 1892.
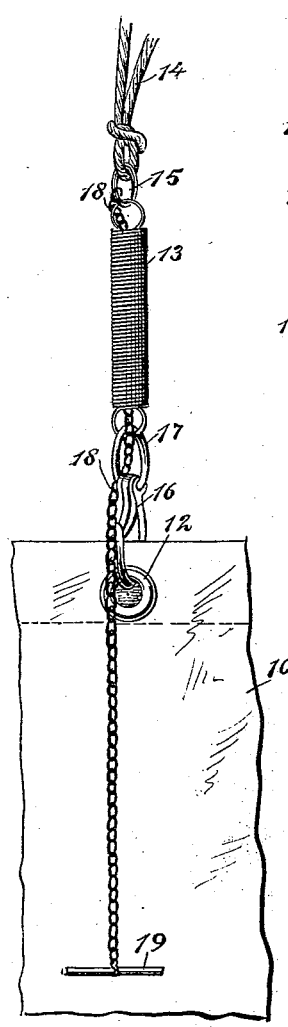
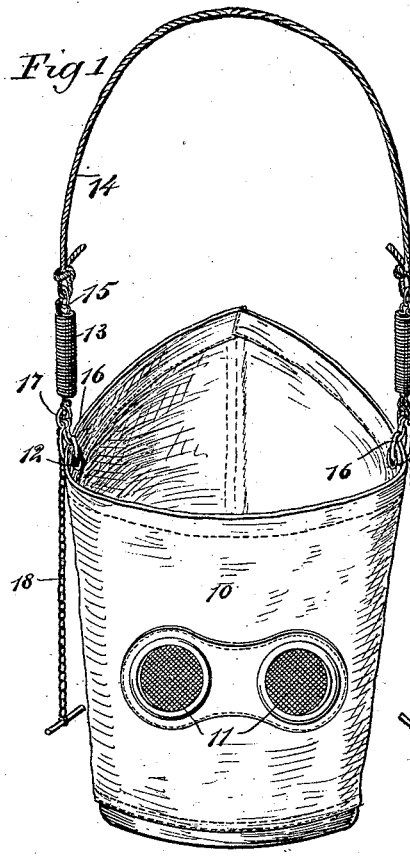
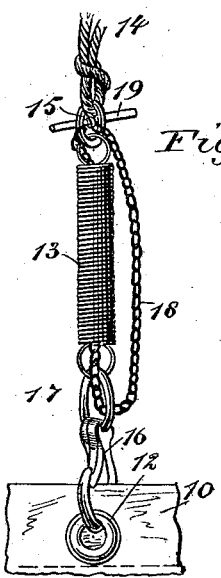
WITNESSES:
INVENTOR
ATTORNEYS.

UNITED STATES PATENT OFFICE.

JOHN W. PFEIFFER, OF NEW YORK, N. Y.

FEED-BAG SUPPORT.

SPECIFICATION forming part of Letters Patent No. 472,908, dated April 12, 1892.

Application filed May 7, 1891. Serial No. 391,855. (No model.)

*To all whom it may concern:*

Be it known that I, JOHN W. PFEIFFER, of New York city, in the county and State of New York, have invented new and useful Improvements in Feed-Bag Supports, of which the following is a full, clear, and exact description.

My invention relates to improvements in feed-bag supports. It is customary to suspend a feed-bag upon the head of a horse by means of a rope or strap, and as a result the bag has to be raised high enough so that the horse's muzzle is thrust down into the feed, or, if it is loosely suspended, after the horse has eaten the upper portion of the feed he cannot easily get at the lower portion.

The object of my invention is to provide a simple and convenient support which will adjust itself to the amount of feed carried by the bag and which will hold the bag in position for the horse to conveniently reach his feed without regard to the amount contained in the bag.

To this end my invention consists in a feed-bag support constructed substantially as hereinafter described and claimed.

Reference is to be had to the accompanying drawings, forming a part of this specification, in which similar figures of reference indicate corresponding parts in all the views.

Figure 1 is a perspective view of a bag provided with my improved support. Fig. 2 is a broken detail view showing the position of the support when the bag is empty. Fig. 3 is a broken detail view showing the position of the bag and support when the bag is full, and Fig. 4 is a broken detail view showing the manner in which the bag is suspended beneath a carriage.

The feed-bag 10 is of the usual form, having the screen-covered ventilating-holes 11 in front and the eyes 12 near the top, by means of which it may be suspended, and any kind of a bag may be used.

The bag is suspended by means of springs 13 and the rope 14, the springs being secured to the bag in the manner described and the rope being tied to the upper ends of the springs. Each spring 13 has a ring 15 at its upper end, into which one end of the rope 14 is tied, and the lower end of the spring is secured to the eye 17 of a snap-hook 16, which hook is adapted to be snapped into one of the eyes 12 of the bag. A chain 18 is secured to the upper ring 15 and extends longitudinally through the spring and through the eye 17 of the snap-hook, the lower end of the chain terminating in a cross-bar 19, which is long enough to extend beyond the sides of the eye 17, and the chain and cross-bar limit the expansion of the spring.

The bag is suspended upon the head of a horse in the usual manner, and when filled with grain it pulls down the springs 13, as shown in Fig. 3, until the cross-bars 19 prevent the bag from dropping farther. As the horse eats his feed and the bag becomes lighter the springs 13 contract and the bag is drawn up, thus keeping the feed a convenient distance from the horse's mouth.

It is the practice among teamsters to put their horses' feed into the feed-bags and suspend the bags from beneath their wagons, and when this is done the chain 18 is doubled upon itself and the cross-bar 19 thrust through the ring 15 at the upper end of the spring, and the chain will thus prevent the bags from dropping down and spilling the grain.

Having thus described my invention, I claim as new and desire to secure by Letters Patent—

1. A feed-bag support comprising a spiral spring having a snap-hook at its lower end, which hook is provided with an eye, and a chain secured to the upper end of the spring and extending longitudinally through the same, said chain terminating at its lower end in a cross-bar and being of greater length than the spring, through which it freely passes, and serving to limit the expansion thereof, substantially as described.

2. A feed-bag support comprising a spiral spring having at its upper end a ring and at its lower end a snap-hook, which is provided with an eye, and a chain secured to the upper ring and extending longitudinally through the spring, said chain terminating at its lower end in a fastening device by which it may be secured in the eye of the snap-hook and being of greater length than the spring through which it freely passes and serving to limit the expansion thereof, substantially as described.

JOHN W. PFEIFFER.

Witnesses:
WARREN B. HUTCHINSON,
EDGAR TATE.